US008243835B2

(12) United States Patent
Sun et al.

(10) Patent No.: US 8,243,835 B2
(45) Date of Patent: Aug. 14, 2012

(54) METHOD AND APPARATUS FOR MEASUREMENT REPORT FOR THE DECISION OF TRANSMISSION MODE TRANSITION

(75) Inventors: Chengjun Sun, Beijing (CN); Yujian Zhang, Beijing (CN); Chunying Sun, Beijing (CN); Xiaoquiang Li, Beijing (CN); Ju-Ho Lee, Suwon-si (KR)

(73) Assignees: Samsung Electronics Co., Ltd (KR); Beijing Samsung Telecom R & D Center (CN)

( * ) Notice: Subject to any disclaimer, the term of this patent is extended or adjusted under 35 U.S.C. 154(b) by 1080 days.

(21) Appl. No.: 12/159,726

(22) PCT Filed: Dec. 28, 2006

(86) PCT No.: PCT/KR2006/005833
§ 371 (c)(1),
(2), (4) Date: Jun. 30, 2008

(87) PCT Pub. No.: WO2007/078112
PCT Pub. Date: Jul. 12, 2007

(65) Prior Publication Data
US 2009/0010319 A1 Jan. 8, 2009

(30) Foreign Application Priority Data

Dec. 31, 2005 (CN) .......................... 2005 1 0135921

(51) Int. Cl.
*H04K 1/10* (2006.01)
(52) U.S. Cl. ........ 375/260; 375/267; 375/272; 375/295; 375/316; 375/322

(58) Field of Classification Search .......... 375/135–136, 375/219, 259, 260, 267, 271, 279, 295, 316, 375/322, 329, 346, 350
See application file for complete search history.

(56) References Cited

U.S. PATENT DOCUMENTS

| 7,706,804 | B2* | 4/2010 | Huh et al. ...................... 455/450 |
| 8,094,733 | B2* | 1/2012 | Kwon et al. .................. 375/260 |
| 2004/0022213 | A1 | 2/2004 | Choi | |
| 2005/0053038 | A1* | 3/2005 | Kimura ......................... 370/333 |
| 2005/0068884 | A1* | 3/2005 | Yoon et al. .................... 370/203 |
| 2005/0135253 | A1 | 6/2005 | Cai et al. | |
| 2005/0170782 | A1* | 8/2005 | Rong et al. ................. 455/67.11 |
| 2005/0191965 | A1* | 9/2005 | Yu et al. ..................... 455/67.16 |

(Continued)

FOREIGN PATENT DOCUMENTS

EP 156492 A2 10/1985

(Continued)

*Primary Examiner* — Hirdepal Singh
(74) *Attorney, Agent, or Firm* — The Farrell Law Firm, P.C.

(57) ABSTRACT

Disclosed are a method and apparatus for measurement report for the decision of transmission mode transition that obtain a threshold value of reporting CQI_difference of all frequency sub-bands; measure a CQI value at each CQI reporting frequency sub-band of whole frequency band in each measure time interval; determine a CQI_difference value based on the measured CQI value of each CQI reporting frequency sub-band; and compare the determined CQI_difference value with the threshold value, if a condition is satisfied, then the UE sends the determined CQI_difference value to the BS. After the UE has reported this measurement report to the BS, the BS may choose a more suitable data transmission mode for the UE based on this measurement report to make data transmission more effective.

14 Claims, 4 Drawing Sheets

U.S. PATENT DOCUMENTS

| | | |
|---|---|---|
| 2005/0201296 A1* | 9/2005 | Vannithamby et al. ....... 370/241 |
| 2005/0289256 A1* | 12/2005 | Cudak et al. .................... 710/62 |
| 2006/0221807 A1 | 10/2006 | Fukuoka et al. |
| 2007/0026810 A1* | 2/2007 | Love et al. ................. 455/67.11 |
| 2007/0098098 A1* | 5/2007 | Xiao et al. .................... 375/260 |
| 2008/0063117 A1 | 3/2008 | Cheng et al. |

FOREIGN PATENT DOCUMENTS

| | | |
|---|---|---|
| JP | 15-204298 A | 7/2003 |
| JP | 2005-184809 | 7/2005 |
| KR | 10-2003-077733 A | 10/2003 |
| WO | WO 2004/077871 | 9/2004 |
| WO | WO 2005/006622 | 1/2005 |
| WO | WO 2005/013525 | 2/2005 |

* cited by examiner

METHOD AND APPARATUS FOR MEASUREMENT REPORT FOR THE DECISION OF TRANSMISSION MODE TRANSITION

PRIORITY

This application claims priority to an application filed in the Chinese Intellectual Property Office on Dec. 31, 2005, and assigned Serial No. 200510135921.X, and to PCT application PCT/KR2006/005833, filed on Dec. 28, 2006, the contents of each which are incorporated herein by reference.

BACKGROUND OF THE INVENTION

1. Field of the Invention

The present invention relates to a radio communication system with localized data transmission mode and distributed data transmission mode, and, in particular, to a method for creating a measurement report to determine conversion of transmission mode and apparatus for using the same.

2. Description of the Related Art

The $3^{rd}$ Generation Mobile Communication System Partnership Project (referred to as 3GPP) standardization organization has commenced on a Long-term Evolution (referred to as LTE) to existing system criteria. Among numerous physical layer transmission techniques, OFDM (Orthogonal Frequency Division Multiplexing) has become a challenge in all downlink solutions, due to advantages such as higher spectrum utilization efficiency and lower processing complexity.

OFDM is a multi-carrier modulation communication technique, and its basic principle is to divide a high rate data stream into multiple low rate data streams to transmit via a group of orthogonal sub-carriers simultaneously. Because of the features of multi-carrier technique, the OFDM technique bears superior performance in many aspects.

An example of the remarkable superiority of the OFDM technique lies in that Inter-Symbol Interference (ISI) can be completely eliminated when channel delay is less than the length of a Cyclic Prefix (CP), which is introduced in by adding guard spacing to each symbol), for data is transmitted through multiple sub-carriers in parallel and the length of symbol in each sub-carrier is correspondingly increased without sensitivity to channel delay. In this way, each sub-carrier experiences a flat fading channel. An entire OFDM symbol consists of an available OFDM signal and a cyclic prefix. Here, the implementation of the CP is realized by directly copying some samples at the back of the available OFDM signal to the front of the available OFDM signal.

The OFDM technique also bears a high spectrum utilization efficiency. In the frequency domain, OFDM signals overlap actually. This overlap improves spectrum utilization efficiency in great extent.

The OFDM technique also bears a strong ability in anti-narrowband interference or resisting frequency selective fading. Through channel coding and interleaving, the frequency diversity effect and the time diversity effect can be achieved in OFDM so that either narrowband interference or frequency selective fading can be effectively resisted.

Another example of the remarkable superiority of the OFDM technique is that the modulation can be realized through a base-band Inverse Fast Fourier Transform (IFFT), and IFFT/FFT makes available a fast calculation method and can be conveniently implemented in a Digital Signal Processing (DSP) chip and hardware structure.

There are two transmission modes in the OFDM radio transmission system: localized transmission mode and distributed transmission mode.

The called localized data transmission means that the data is transmitted in sequential sub-carriers of the localized sub-band, and the network entity will specify effective modulation and coding method for its data transmission to realize adaptive modulation coding based on channel quality between a Base Station (BS) and User Equipment (UE), thus data transmission throughput is increased. The distributed transmission mode means that the UE uses comb-like subcarriers to transmit over the whole frequency band, making the sub-carriers that transmit data be distributed in the whole frequency band as much as possible, thus maximizing frequency diversity gain. Usually the localized data transmission mode which can use adaptive modulation coding and frequency scheduling has greater transmission gain. However, for some channels which change very fast, channel conditions predicted at some time can't reflect that of the next time, therefore localized transmission is hard to implement. In this condition, distributed data transmission is often used to transmit data via frequency diversity gain.

The process of transmission for downlink data is now described.

For a localized transmission mode, a UE will measure the channel quality for each sub-band in the system frequency band, and then report the measured Channel Quality Indicator (CQI) of each sub-band to the BS. Having received the CQIs, the BS determines whether to allocate frequency resources to the UE, and which localized frequency bands will be allocated to UE for data transmission, according to the reported CQI from each UE and the system current load. During the process of data transmission, it is necessary for the UE to continue to measure the channel quality for each sub-band in the system frequency band and transmit the measured CQI to the base station so as to achieve the goals of frequency scheduling and Adaptive Modulation Coding (AMC) for data transmission. In this way, maximum throughput of data transmission may be reached.

For a distributed transmission mode, the UE will measure the mean channel quality of the entire system frequency band, then report the single average CQI to the base station. Having received this mean CQI, the BS determines whether to allocate distributed frequency resources to the UE according to the reported CQI from each UE and the system current load. During the process of data transmission, it is also necessary for the UE to continue to measure the average CQI of the entire system frequency band and transmit the measured CQI to the base station so as to achieve the goals of frequency scheduling and Adaptive Modulation Coding (AMC) for data transmission. In this way, maximum throughput of data transmission can be reached.

It is seen from the descriptions above that, when in the localized transmission mode, the contents of the measurement report sent to the BS from the UE are CQIs in sub-bands, and, when in the distributed transmission mode, the UE only sends the single average CQI to the BS. Therefore, the number of bits necessary for the transmission of CQI information in the localized transmission mode is far greater than that in the distributed transmission mode.

In the LTE system, the system will select an appropriate transmission mode for data transmission between the BS and the UE based on the channel condition between them. The conversion between localized transmission and distributed transmission will probably happen when the channel condition between the BS and the UE changes. OFDM transmission is currently used in IEEE 802.16E radio transmission technology specification. The transition between the two modes will probably happen during the data transmission process, with the conversion process as follows. For a distributed transmission mode to a localized transmission mode, the conversion process is a follows. If, in a specific time duration, the maximum value of standard deviation of Signal to Noise Radio (SNR) measured in all frequency sub-bands in the time domain is lower than an predefined threshold value and the mean SNR of the whole frequency band is larger than the predefined threshold value, then the UE transmits transition request from the distributed transmission mode to the localized transmission mode to the BS, and CQIs of 5 sub-bands with best channel quality. When the BS receives such a request, it specifies sub-bands that the UE may use and appropriate adaptive modulation coding based on channel quality in several sub-band reported by the UE. In this way the UE may transit its data transmission mode from distributed transmission to localized data transmission.

For a localized transmission mode to a distributed transmission mode, the conversion process is as follows. If, in a specific duration, the maximum value of standard deviation of SNRs measured in all frequency sub-bands in time domain is higher than a predefined threshold value, then the UE transmits a transition request from the localized transmission mode to the distributed transmission mode to the BS, and sends the channel quality of the whole frequency band until the BS has allocated distributed channel resource for the UE. When the UE receives a distributed channel resource indicator, it may transit its data transmission mode from localized data transmission to distributed data transmission.

It may be seen from a data transmission mode conversion method in the IEEE 802.16E specification that if the maximum value of standard deviation of SNRs measured in all frequency sub-bands in the time domain is comparatively large, the distributed transmission mode is suitable for the UE, and if the maximum value of standard deviation of SNRs measured in all frequency sub-bands in time the domain is comparatively small and the mean SNR of the whole frequency band is larger than a predefined threshold value, the localized transmission mode is the suitable transmission mode for the UE. As the time domain channel variation for a high speed moving UE has a comparatively large variance, and the time domain channel variation for a low speed moving UE has a comparatively small variance, according to the IEEE 802.16E specification, distributed data transmission is suitable for UE's moving at high speed. For UE's moving at low speed, if the mean SNR of its whole frequency band is high, then localized data transmission is suitable.

As for localized transmission mode, since more uplink signaling is needed to transmit CQI in several sub-bands, the corresponding uplink signaling load is heavy. However, for data transmission in a flat fading channel condition, localized data transmission can't acquire much selective frequency gain compared to distributed data transmission, because SNRs of all sub-carriers are basically the same no matter that they are localized data transmission carriers or distributed data transmission carriers. Thus, their adaptive modulation coding gains are basically the same regardless of whether they use distributed data transmission or localized data transmission. But localized data transmission needs an uplink CQI report for multi-bands, thus introducing heavier signaling load compared to distributed data transmission. It may be seen that for flat fading channel, even for low speed UEs with a comparatively high mean SNR, distributed data transmission may still acquire the same selective frequency gain as that of localized data transmission, and its uplink signaling overhead is small. Thus, the distributed data transmission mode is more suitable.

Therefore some improvements may be made for the mode transition method of the IEEE 802.16E specification to make the UE use a more suitable transmission mode to transmit data.

SUMMARY OF THE INVENTION

Therefore, an object of present invention is to provide a method and apparatus for creating a measurement report for making a transmission mode transition decision, by which a BS could determine whether a channel of a UE has a large frequency selectivity gain based on a measurement report and indicate the mode suitable for the UE based on the determined result.

According to one aspect of the present invention, a method of creating measurement report for the decision of transmission mode transition includes obtaining by a UE a threshold value of reporting CQI_difference of all frequency sub-bands; the UE measuring a channel quality indicator value at each CQI reporting frequency sub-band of a whole frequency band in each measure time interval; the UE determining a CQI_difference value based on the measured CQI value of each CQI reporting frequency sub-band; and the UE comparing the determined CQI_difference value with the threshold value, if a condition is satisfied, the UE sending the determined CQI_difference value to the BS.

In present invention, after the UE has reported the measurement report to the BS, the BS may choose a more suitable data transmission mode for the UE based on this measurement report to provide more effective data transmission. This measurement report may make the UE choose distributed data transmission in flat fading channel with good channel condition, thus reducing uplink CQI report signaling load on the premises of not impacting transmission gain.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the annexed drawings. In the following description, a detailed description of known functions and configurations incorporated herein will be omitted when it may obscure the subject matter of the present invention.

The present invention provides a method for creating a new measurement report needed by a low speed UE to realize a transition between a localized transmission mode and a distributed mode, such measurement may reflect fading difference of channels between the BS and the UE in CQI reporting sub-bands of various channel quality. If the difference is comparatively large, then the localized transmission mode is more suitable for the corresponding downlink transmission, otherwise, the distributed transmission mode is more suitable. Measurement report CQI_difference, which reflects CQI difference of various CQI reporting frequency sub-bands, may be selected from the following:

1) a difference value of the maximum CQI value subtracting the minimum CQI value among all CQI reporting frequency sub-bands, if there are M number of CQI reporting frequency sub-bands in the frequency band, the CQI value of the $i^{th}$ frequency sub-band is $CQI_i$, then the measurement report may be denoted by Equation (1):

$$CQI\_difference = Max\{CQI_i, i=1,2,\ldots,M\} - Min\{CQI_i, i=1,2,\ldots,M\} \quad (1)$$

2) a difference value of the maximum the CQI value subtracting the mean CQI value of all CQI reporting frequency sub-bands, if there are M CQI reporting frequency sub-bands in the frequency band, CQI value of the $i^{th}$ frequency band is $CQI_i$, then the measurement report may be denoted by Equation (2):

$$CQI\_difference = Max\{CQI_i, i=1,2,\ldots,M\} - mean\{CQI_i, i=1,2,\ldots,M\} \quad (2)$$

3) a difference value of the mean CQI value subtracting the minimum CQI value of all CQI reporting frequency sub-bands, if there are M CQI reporting frequency sub-bands in the frequency band, the CQI value of the $i^{th}$ frequency sub-band is $CQI_i$, then the measurement report may be denoted by Equation (3):

$$CQI\_difference = mean\{CQI_i, i=1,2,\ldots,M\} - Min\{CQI_i, i=1,2,\ldots,M\} \quad (3)$$

4) a coefficient of Variance of CQI values of all CQI reporting frequency sub-bands, whose definition is standard deviation of all CQI values divided by the mean value, if there are M number of CQI reporting frequency sub-bands in the frequency band, the CQI value of the $i^{th}$ frequency sub-band is $CQI_i$, then the measurement report may be denoted by Equation (4):

$$CQI\_difference = Standard\ deviation\{CQI_i, i=1,2,\ldots,M\}/mean\{CQI_i, i=1,2,\ldots,M\} \quad (4)$$

5) a variance of CQI values of all CQI reporting frequency sub-bands, if there are M number of CQI reporting frequency sub-bands in the frequency band, the CQI value of the $i^{th}$ frequency sub-band is $CQI_i$, then the measurement report may be denoted by Equation (5):

$$CQI\_difference = Variance\{CQI_i, i=1,2,\ldots,M\} \quad (5)$$

6) a standard deviation of CQI values of all CQI reporting frequency sub-bands, if there are M number of CQI reporting frequency sub-bands in the frequency band, the CQI value of the $i^{th}$ frequency sub-band is $CQI_i$, then the measurement report may be denoted by Equation (6):

$$CQI\_difference = Standard\ deviation\{CQI_i, i=1,2,\ldots,M\} \quad (6)$$

In order to make the BS better judge the transmission mode suitable for the UE, the UE needs to report measurement metrics that describe CQI difference of CQI reporting frequency bands based on one of the above definitions to the BS, the measurement report could be a event trigger, and also could be periodical.

Figure 1:
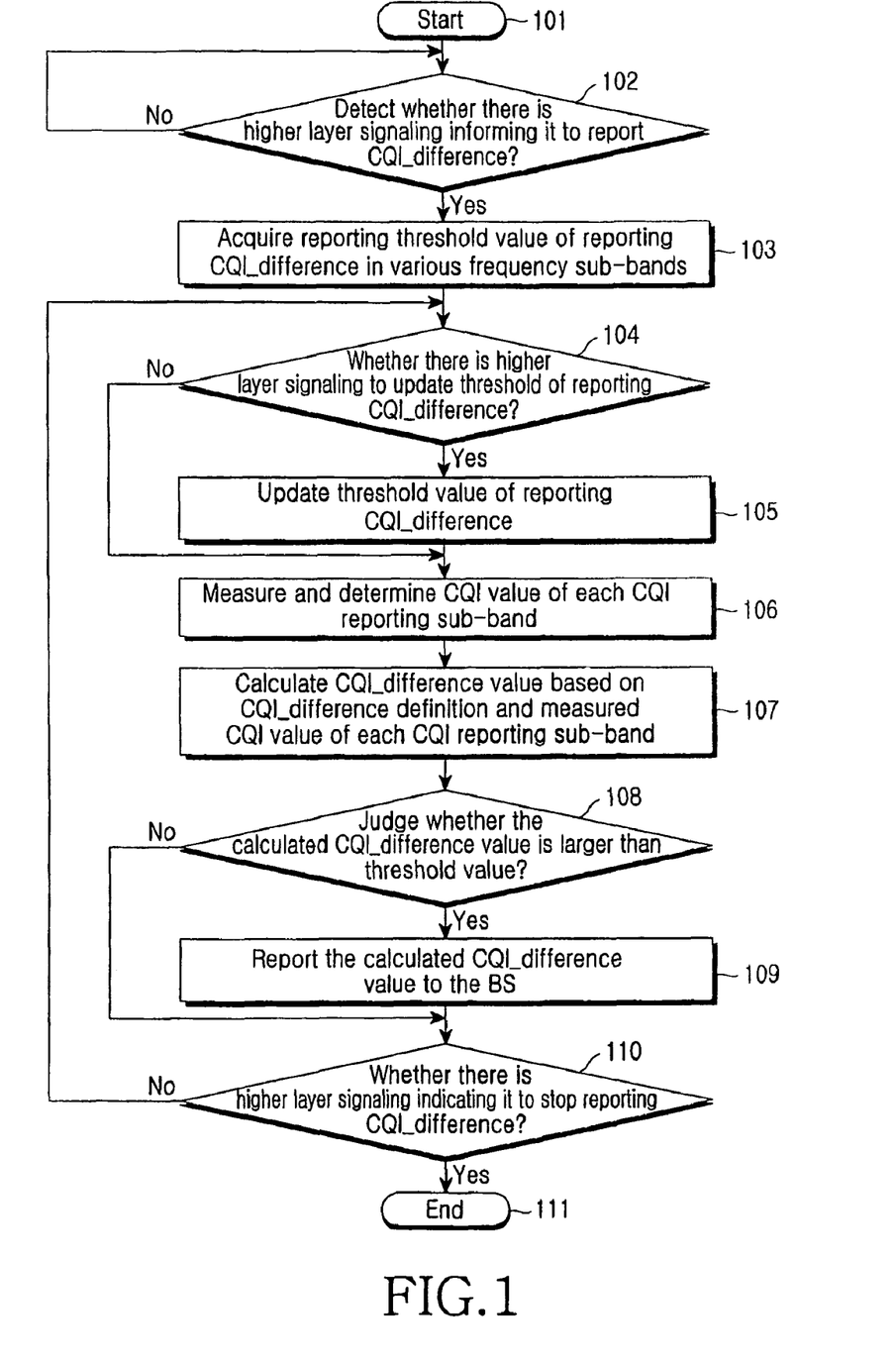
FIG. 1 is a flowchart showing the method for a UE to create an event trigger measurement report of the present invention.

Here, a flowchart of method for the UE to fulfill such measurement report driven by event is shown in FIG. 1. At step 101 of FIG. 1 the process starts, followed by, at step 102, the UE detecting whether there is higher layer signaling from network entity informing it to send CQI_difference measurement report. If a higher layer signaling is detected, the process goes to step 103. The process otherwise continues with the detecting in step 102.

At step 103 of FIG. 1 the UE obtains a CQI_difference threshold value of all frequency sub-bands. The way to obtain could be defined by specification or higher layer signaling informing. The network entity may indicate an appointed CQI_difference value to be threshold value via higher layer signaling, or an appointed CQI_difference value is already specified in some specification as the threshold value.

At step 104 the UE detects whether there is a higher layer signaling from the network entity informing it to update its threshold value of reporting the CQI_difference. If there is, the process goes to step 105, and otherwise continues with step 106.

At step 105 the UE updates the threshold value of its reported CQI_difference according to the network entity signaling.

At step 106 the UE measures SNRs of pilot channel of each CQI reporting sub-band and determines the CQI value of each CQI reporting sub-band.

At step 107 the UE calculates the CQI_difference value based on the measured CQI value of each CQI reporting sub-band and the expression defining CQI_difference. There are two steps in CQI_difference calculating process, (1) time domain moving average filtering, and (2) calculating according to the equations outlined herein.

The time domain moving average filtering means that whenever making a measurement, averaging will be made on the current measured value and a number of afore measured values to get the moving averaged value. For example, if the measurement metric is x, time the interval between each two sequential measurements is t_m, the length of the moving average time window is t_w, and the sequence number of current measurement is N, then the measurement value after time domain average filtering could be shown in Equation (7):

$$\overline{x} = \frac{1}{(t\_w/t\_m)} \sum_{i=0}^{(t\_w/t\_m)-1} x_{N-i} \quad (7)$$

When calculating the CQI_difference, it can take step (1) can be performed first and then step (2) described above, namely first taking the moving average filtering of measured CQI values of each CQI reporting sub-band in step 106 to obtain a moving average CQI value of each CQI reporting sub-band, then substituting the moving average value into the expression and calculating CQI_difference value.

When calculating the CQI_difference, step (2) can be performed first and then step (1), namely first substituting the measured CQI value of each CQI reporting sub-band into the expression and calculating CQI_difference value, then taking the moving average filtering of each calculated CQI_difference value to get the CQI_difference moving average value.

At step 108 it is determined whether the calculated CQI_difference value is larger than a threshold value of reporting. If it is, the method proceeds to step 109. Otherwise that method proceeds to step 110.

At step 109 the UE reports the CQI_difference value to the BS and at step 110 the UE determines whether there is higher layer signaling indicating to stop CQI_difference reporting. If so, the method proceeds to step 111. Otherwise the method returns to step 104.

At step 111 the process terminates.

Figure 2:
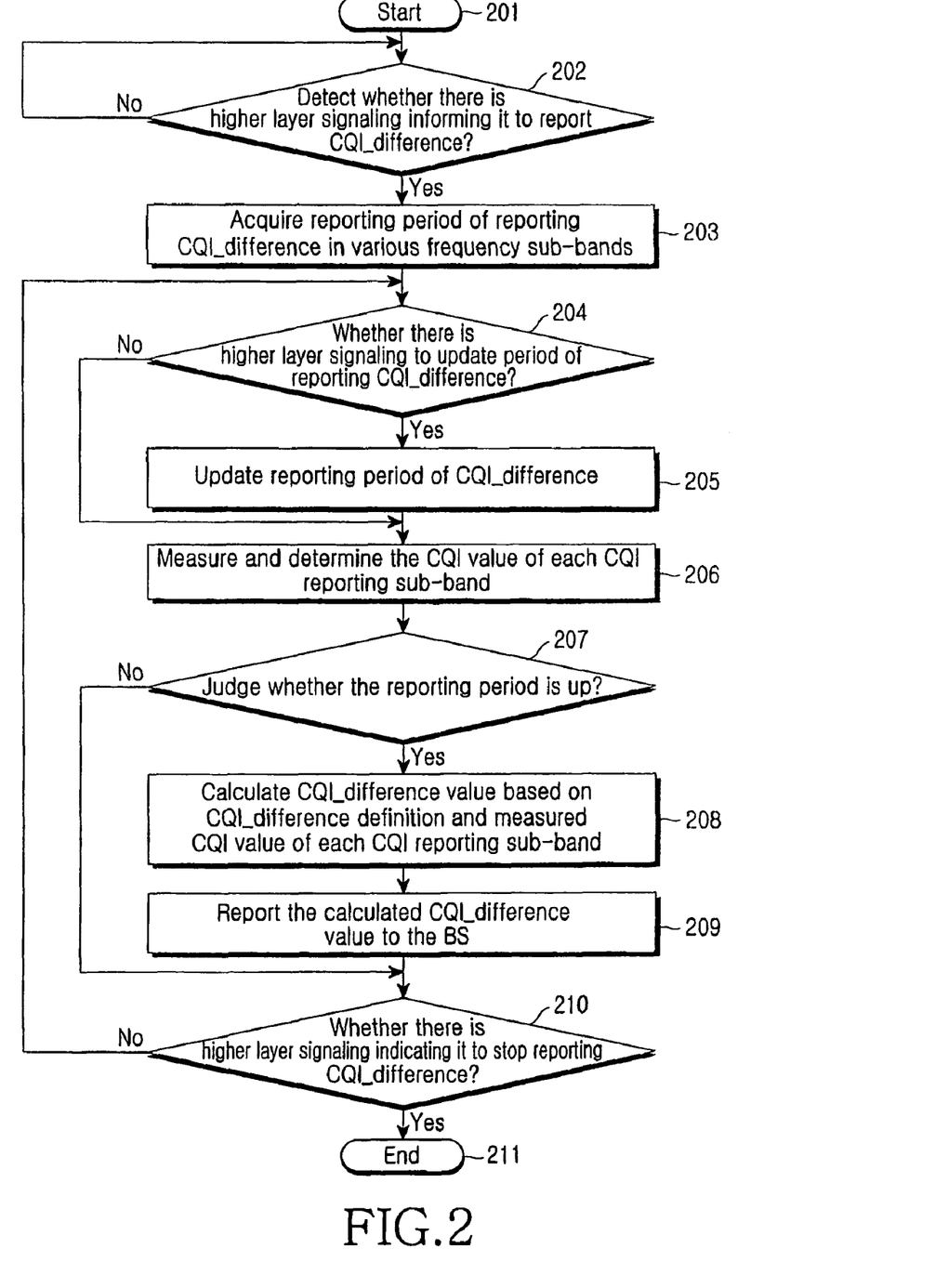
FIG. 2 is a flowchart showing a method for a UE to create a periodical measurement report of the present invention.

A flowchart for the UE to fulfill such measurement report periodically is shown in FIG. 2. At step 201 the process starts and at step 202 the UE detects whether there is higher layer signaling from a network entity informing it to send the CQI_difference measurement report. If so, the process proceeds to step 203. If not, the process returns to step 202.

At step 203 the UE obtains a CQI differential period of all frequency sub-bands, as defined by specification or higher layer signaling informing. The network entity may indicate an appointed time length as a threshold value via the higher layer signaling, or an appointed time length is already specified in some specification as the period.

At step 204, the UE detects whether there is higher layer signaling from a network entity informing it to update its period of reporting the CQI_difference. If so, the process proceeds to step 105. If not, the process continues to step 106.

At step 205, the UE updates the period of its reported CQI_difference according to the network entity signaling.

At step 206, the UE measures the SNRs of pilot channel of each CQI reporting sub-band and determines the CQI value of each CQI reporting sub-band.

At step 207, the process determines whether the reporting period has expired. If so, the process proceeds to step 208. If not, the process continues to step 210.

At step 208 the UE calculates the CQI_difference value based on the measured CQI value of each CQI reporting sub-band and the expression defining the CQI_difference. There are two steps in the CQI_difference calculating process, (1) time domain moving average filtering, (2) calculating according to the Equations herein. Time domain moving average filtering refer to whenever making a measurement, averaging will be made on the current measured value and a number of afore measured values to get the moving averaged value.

When calculating the CQI_difference, it can take step (1) can be first and then step (2), namely first performing a moving average filtering of measured CQI values of each CQI reporting sub-band in step 106 to get the moving average CQI value of each CQI reporting sub-band, then substituting the moving average value into the expression and calculating the CQI_difference value.

When calculating the CQI_difference, step (2) can be performed first and then step (1), namely first taking the measured CQI value of each CQI reporting sub-band into the expression and calculating the CQI_difference value. Then the moving average filtering of each calculated CQI_difference value is performed to get the CQI_difference moving average value. At step 209 the UE reports the CQI_difference value to the BS and at step 210, the UE determines whether there is a higher layer signaling indicating to stop CQI_difference reporting. If so, the process proceeds to step 211. If not, the process returns to step 204. At step 211 the reporting process terminates.

Figure 3:
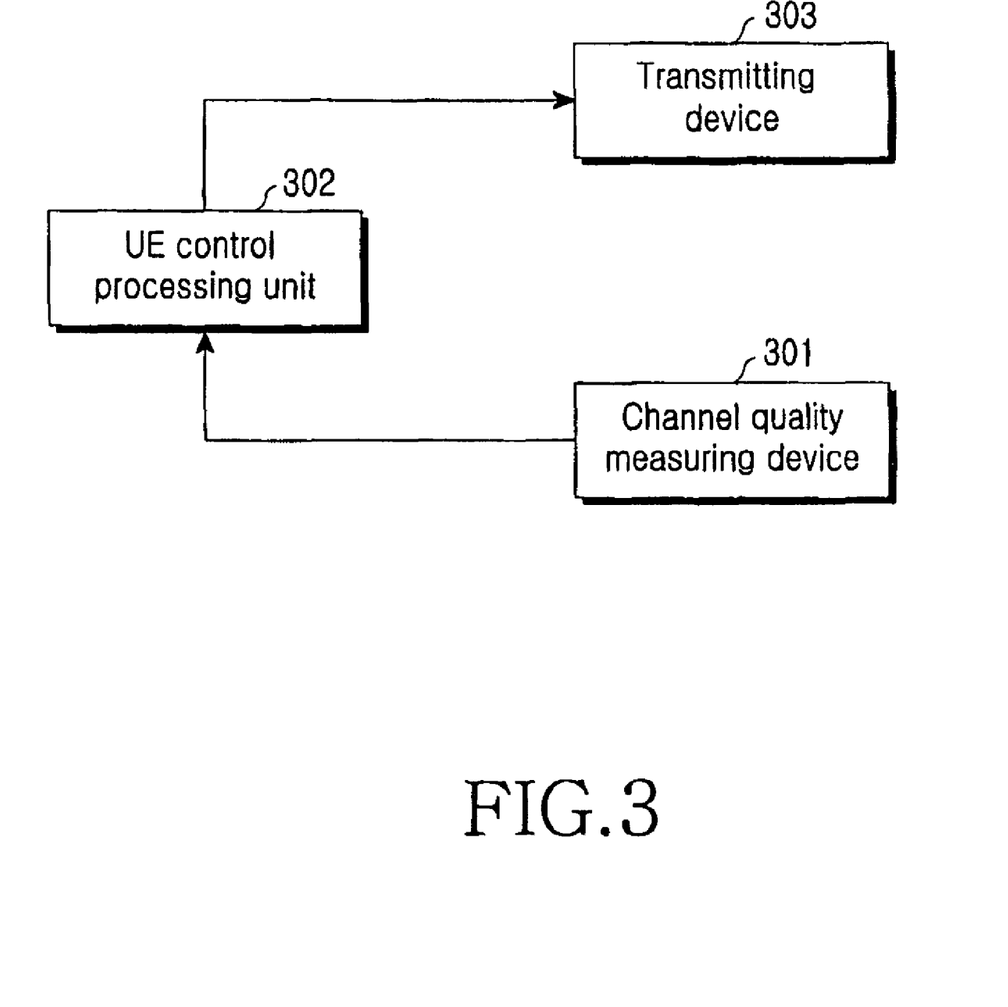
FIG. 3 is a block diagram showing an apparatus for a UE to carry out a CQI_difference reporting of the present invention.

The present invention also provides an apparatus for carrying out the above mentioned measurement report, as shown in FIG. 3.

In the FIG. 3, the function realized by the UE in control processing unit 302 embodies the present invention. First, the UE measures channel quality of all CQI reporting frequency sub-bands via channel quality measuring device 301 that is set to get the measured CQI value of each CQI reporting sub-band, and then transmits the measured result to control processing unit 302, which functions as described below.

The moving average filtering is initially performed to obtain the mean moving average CQI value of all CQI reporting frequency sub-bands, then the CQI_difference value is calculated according to the equations provided above to calculate the CQI_difference. Next, it is determined whether to send this CQI_difference value to the BS via a transmitting device 303 according to reporting condition.

In addition, the CQI value of each CQI reporting sub-band may be substituted into the CQI_difference calculating expression to calculate the CQI_difference value. Then the moving average filtering is performed to get moving average value of CQI_difference, and it is determined whether to send this CQI_difference value to the BS via transmitting set 303 according to reporting condition.

To more clearly illustrate the method and apparatus of the present invention, the following description is provided in which the number of CQI reporting frequency sub-bands of the whole frequency band in the system is eight (8), and the CQI value of each frequency sub-band may be indicated with five (5) bits, namely the minimum value is 0 and the maximum value is 31. The UE measures the CQI once every t_m=0.5 ms, and a time window duration of making moving average filtering is t_w=10 ms.

The method for the UE to determine the CQI_difference value is provided in this embodiment with the measurement metric used to report the CQI_difference value is the difference value of maximum CQI value subtracting minimum CQI value, namely the CQI_difference calculated from Equation (1). The steps for the UE to determine the CQI_difference value are as follows:

As a first step, the UE measures the SNRs of all pilot signals of all CQI reporting sub-bands in each time interval of 0.5 ms long, and calculates the mean values of SNRs of the pilot signals of separate sub-bands, then determines the CQI value of each CQI reporting sub-band based on those mean SNRs.

As a second step, the CQI_difference value is determined based on CQI values of each CQI reporting sub-band obtained from last step and expression used to calculate the CQI_difference value.

There are two alternatives to determine the CQI_difference value: As a first alternative, the moving average filtering of measured CQI values of each CQI reporting sub-band is performed to obtain a moving average CQI value and the average of all CQI values measured within last 10 ms in each CQI reporting sub-band. As the measurement is taken once each 0.5 ms, and duration of moving average time window is 10 ms, thus the moving average CQI value is acquired by making average of CQIs from recent 20 measurements. After acquiring the moving average CQI value of each CQI reporting sub-band, it may calculate the CQI_difference value based on Equation (1). Suppose the moving average CQI values of 8 CQI reporting sub-bands at some moment is shown in Table 1, which provides examples showing the moving average CQI values of 8 CQI reporting sub-bands at a certain time

TABLE 1

| Sub-band number | 1 | 2 | 3 | 4 | 5 | 6 | 7 | 8 |
|---|---|---|---|---|---|---|---|---|
| moving average CQI value | 29 | 30 | 28 | 26 | 27 | 26 | 25 | 27 |

In this way, the CQI_difference may be calculated according to Equation (8):

$$CQI\_difference = \qquad\qquad (8)$$
$$Max\{CQI_i, i = 1, 2, \ldots, 8\} - Min\{CQI_i, i = 1, 2, \ldots, 8\} =$$
$$CQI_2 - CQI_7 = 30 - 25 = 5$$

As an alternative to the above, the measured CQI values of each CQI reporting sub-band are substituted into the Equation used to calculate the CQI_difference respectively to calculate the CQI_difference value, then the moving average filtering of CQI_difference values is performed to get the CQI_difference moving average value, as the CQI_difference value to be reported. Namely, the CQI values of all CQI reporting sub-bands measured within time interval of 0.5 ms are substituted into Equation (1) respectively and the CQI_difference value of each time interval of 0.5 ms long is calculated, then the average of CQI_difference values of each 0.5 ms time interval within a recent 10 ms is obtained. If 0.5 ms is the duration of a sub-frame, it may be supposed that the CQI_difference values of all sub-frames are as shown in Table 2, which provides an example of the CQI_difference values of several 0.5 ms sub-frames.

TABLE 2

| Sub-frame number | N | N-1 | N-2 | N-3 | N-4 | N-5 | N-6 | N-7 | N-8 | N-9 | N-10 |
|---|---|---|---|---|---|---|---|---|---|---|---|
| CQI_difference value | 6 | 2 | 4 | 9 | 8 | 7 | 5 | 3 | 4 | 6 | 5 |
| Sub-frame number | N-11 | N-12 | N-13 | N-14 | N-15 | N-16 | N-17 | N-18 | N-19 | N-20 | ... |
| CQI_difference value | 5 | 2 | 3 | 6 | 7 | 7 | 8 | 1 | 5 | 6 | ... |

If the current sub-frame number is N, then the mean CQI_difference may be calculated after performing moving average filtering as shown in Equation (9):

$$CQI\_difference = \frac{1}{(t\_w/t\_m)} \sum_{i=0}^{(t\_w/t\_m)-1} CQI\_difference_{N-i} \qquad (9)$$
$$= \frac{1}{(10/0.5)} \sum_{i=0}^{(10/0.5)-1} CQI\_difference_{N-i}$$
$$= \frac{1}{20} \sum_{i=0}^{19} CQI\_difference_{N-i}$$
$$= \frac{1}{20}(6 + 2 + 4 + 9 + 8 + 7 + 5 + 3 + 4 +$$
$$6 + 5 + 5 + 2 + 3 + 6 + 7 + 8 + 1 + 5)$$
$$= 4.8$$

After the UE has determined the CQI_difference value, it sends the CQI_difference report to the BS according to reporting condition. Here the CQI_difference reporting process in the UE can be described in an event triggered report the process embodiment and a periodical reporting process embodiment separately.

In regard to the event triggered reporting embodiment, the UE acquires the threshold value of reporting after receiving higher layer signaling indicating it is to report the CQI_difference from the network entity, the threshold value may be specified by the specification or informed by signaling from network entity. If, in the reporting process, the UE receives signaling from the network entity again informing it to update the threshold value of reporting, then the UE makes a corresponding update.

Afterwards, the UE makes a measurement according to the above mentioned steps, and determines the CQI_difference value to be reported.

After CQI_difference is determined, it should be compared with CQI_difference threshold value. If it is larger than the threshold value, then the UE will send this CQI_difference value to the BS. Otherwise, it goes on with the measurement and sends a newly determined CQI_difference value to the BS when the reporting condition is satisfied, until the signaling informing it to stop the CQI_difference reporting comes from the network entity.

As for the CQI_difference value determined according to alternative (1) described above that determines CQI_difference value, if the CQI_difference threshold value of reporting is not larger than five (5), then the UE will send the CQI_difference value to the BS, and if the threshold value is larger than five (5), then the UE will not send this CQI_difference value to the BS. As for the second alternative described above, if the CQI_difference reporting threshold value is not larger than 4.8, then the UE will send this CQI_difference value to the BS, and if the threshold value is larger than 4.8, then the UE will not send this CQI_difference value to the BS.

In regard to the periodical reporting embodiment, the UE acquires the reporting period after receiving higher layer signaling indicating it is to report the CQI_difference from a network entity, the period can be specified by the specification or informed by signaling from network entity. If, in the reporting process, the UE receives signaling from the network entity again informing it to update the reporting period, then the UE makes corresponding update.

Afterwards, the UE begins to measures CQI values of various CQI reporting sub-bands in each measuring interval. Then the UE will determine the CQI_difference value to be reported according to the afore mentioned steps of determining CQI_difference when each measuring period arrives, and sends this determined CQI_difference value to the BS.

Afterwards, it continues to measure CQI values of various CQI reporting sub-bands in each measuring interval and sends the new determined CQI_difference value to the BS when the reporting period expires until signaling informing it to stop the CQI_difference reporting arrives from the network entity.

It is noted that the period to report the CQI_difference may or may not be equal to moving average window time duration t_w.

Figure 4:
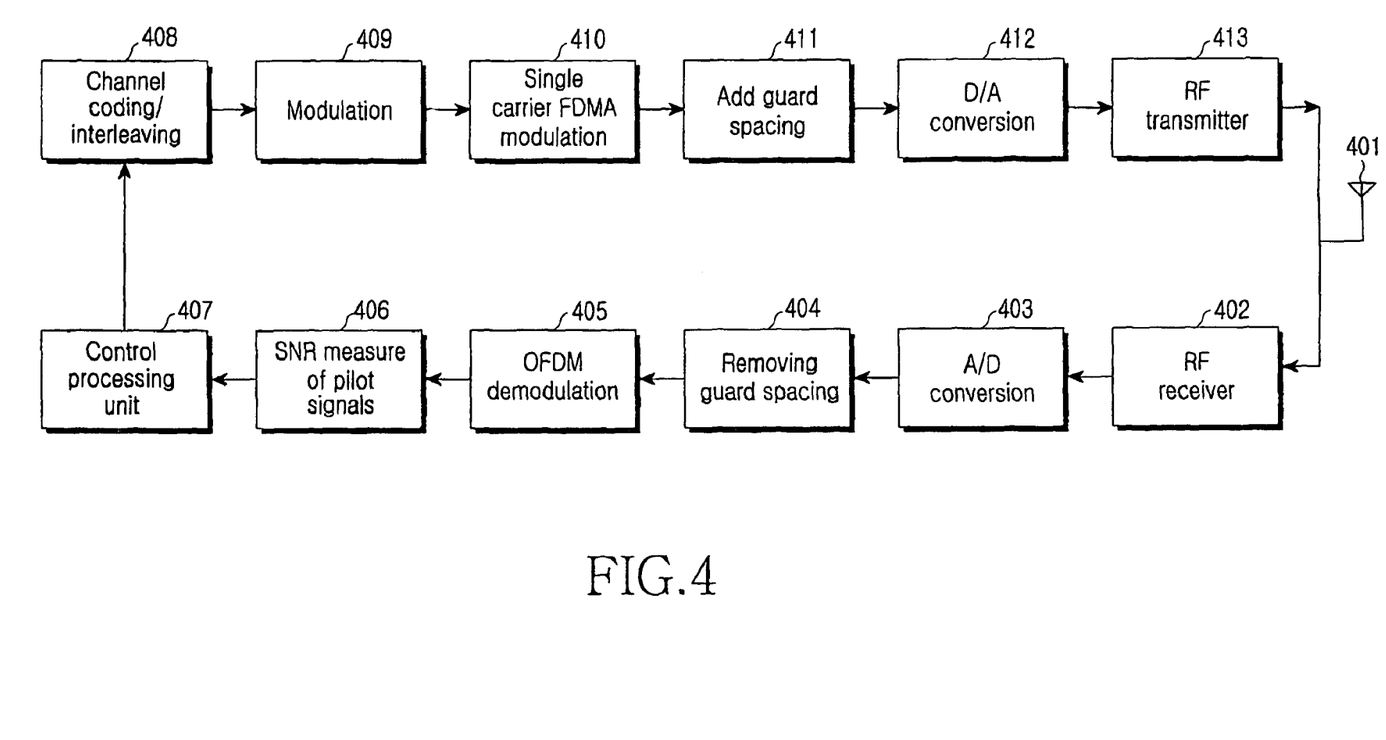
FIG. 4 is a block diagram showing hardware of a UE for reporting CQI_difference in an OFDM system of the present invention.

FIG. 4 provides a block diagram of hardware of the UE to report the CQI_difference in the OFDM system. In FIG. 4, module 406 may measure SNRs of pilot signals in various frequency sub-bands after a signal is received by an antenna 401, processed in Radio Frequency (RF) receiver 402, converted in Analog/Digital (A/D) converter 403, having guard spacing removed in module 404, and being OFDM demodulated in Demodulator 405 and being (DFT transformed. Module 406 then sends the measured result to processing control unit 407.

In the present invention, the control processing unit 407 can first perform moving average filtering to acquire moving average CQI value of each CQI reporting frequency sub-band, then calculate the CQI_difference value according, and determine whether to send this CQI_difference value to the BS based on reporting condition. In addition, the CQI value of each CQI reporting sub-band may be substituted into the expression used to calculate the CQI_difference to calculate the CQI_difference value, and then the moving average filtering is performed to get the CQI_difference moving average value. It is the determined whether to send this CQI_difference value to the BS based on the reporting condition.

If the reporting condition is satisfied, the determined CQI_difference report is sent to the BS after channel coding/interweaving in module 408, after modulating in modulator 409, after single carrier FDMA modulating in modulator 410, adding guard spacing in module 411, D/A conversion in module 412, and transmitting via RF transmitter 413 and antenna 401.

The scope of the present invention is not be limited to the above embodiments, but is defined by the accompanying claims, and all equivalents thereof.

What is claimed is:

1. A method for creating a measurement report for decision of transmission mode transition, the method comprising steps of:
   obtaining by a User Equipment (UE) a threshold value of reporting a Channel Quality Indicator (CQI) difference) of all frequency sub-bands;
   the UE measuring a CQI value in each CQI reporting frequency sub-band of an entire frequency band at each measured time interval;
   the UE calculating moving average CQI values by performing time domain moving average filtering for the measured CQI values of each CQI reporting frequency sub-band;
   the UE determining a CQI_difference value based on a maximum value and a minimum value among the calculated moving average CQI values; and
   the UE comparing the determined CQI_difference with the threshold value, if a condition is satisfied, the UE sending the determined CQI_difference as the measurement report to a base station.

2. The method according to claim 1, wherein in the step of obtaining the threshold value, the threshold value is specified by specification or informed by signalling from a network entity.

3. The method according to claim 1, further comprising:
   during the reporting process, if the UE receives signaling from a network entity for informing the UE to update its reporting threshold value, the UE makes a corresponding update.

4. The method according to claim 1, wherein the CQI difference value is determined according to:

$$\text{CQI\_difference} = \text{Max}\{CQI_i, i=1,2,\ldots,M\} - \text{Min}\{CQI_i, i=1,2,\ldots,M\}.$$

5. The method according to claim 1, wherein the time domain moving average filtering is performed according to:

$$\bar{x} = \frac{1}{(t\_w/t\_m)} \sum_{i=0}^{(t\_w/t\_m)-1} x_{N-i},$$

where x is measurement metric, t_m is a time interval of each measurement, t_w is a duration of moving average time window, N is a sequence number of a currently measured item.

6. A method for creating a measurement report to determine conversion of transmission mode comprising steps of:
   obtaining, by User Equipment (UE), periods of Channel Quality Indicator (CQI) difference in all frequency sub-bands;
   the UE measuring a CQI value in each CQI reporting frequency sub-band of an entire frequency band in each measured time interval;
   the UE calculating moving average CQI values by performing time domain moving average filtering for the measured CQI values of each CQI reporting frequency sub-band;
   the UE determining a CQI_difference value based on a maximum value and a minimum value among the calculated moving average CQI values; and
   the UE sending the determined CQI_difference value based on the obtained periods as the measurement report to a base station.

7. The method according to claim 6, wherein in the step of obtaining periods of CQI_difference in all frequency sub-bands, the CQI_difference period is specified by specification or informed by signaling from a network entity.

8. The method according to claim 6, further comprising:
   during the reporting process, if the UE receives signaling from a network entity for informing the UE to update the periods of CQI difference, then the UE makes a corresponding update.

9. The method according to claim 6, wherein the CQI difference value is determined according to:

$$\text{CQI\_difference} = \text{Max}\{CQI_i, i=1,2,\ldots,M\} - \text{Min}\{CQI_i, i=1,2,\ldots,M\}.$$

10. The method according to claim 6, wherein the time domain moving average filtering is performed according to:

$$\bar{x} = \frac{1}{(t\_w/t\_m)} \sum_{i=0}^{(t\_w/t\_m)-1} x_{N-i},$$

where x is measurement metric, t_m is a time interval of each measurement, t_w is a duration of moving average time window, N is a sequence number of currently measured item.

11. The method according to claim 6, wherein the reporting period amounts to time window duration of moving average filtering.

12. The method according to claim 6, wherein the reporting period does not amount to time window duration of moving average filtering.

13. An apparatus for creating a measurement report to determine conversion of transmission mode, the apparatus includes an antenna, a radio frequency receiver, an analog/digital converter, a removing guard spacing unit, an Orthogonal Frequency Division Multiplex modulation unit, wherein the apparatus further comprises:
  a pilot signal signal to noise ratio measuring unit for measuring channel quality of all frequency sub-bands;
  a User Equipment control processing unit for determining a Channel Quality Indicator difference (CQI_difference) measurement report based on the measured channel quality of all frequency sub-bands and calculating CQI_difference of each CQI reporting frequency sub-bands; and transmitter for sending the calculated CQI_difference measurement report as the measurement report to a base station,
  wherein the User Equipment control processing unit calculates moving average CQI values by performing time domain moving average filtering for the measured CQI values of each CQI reporting frequency sub-band and determines a CQI_difference value based on a maximum value and a minimum value among the calculated moving average CQI values.

14. The apparatus according to claim 13, wherein the User Equipment control processing unit determines the CQI_difference value according to:

$$CQI\_difference = \text{Max}\{CQI_p, i=1,2,\ldots,M\} - \text{Min}\{CQI_p, i=1,2,\ldots,M\}.$$

* * * * *